United States Patent [19]

Brackett

[11] Patent Number: 5,772,225
[45] Date of Patent: Jun. 30, 1998

[54] HYDRAULIC BICYCLE WITH CONJUGATE DRIVE MOTORS

[76] Inventor: Douglas C. Brackett, 2535 Mason Oaks Dr., Valricho, Fla. 33594

[21] Appl. No.: 629,368

[22] Filed: Apr. 8, 1996

[51] Int. Cl.⁶ ................................................ B62M 19/00
[52] U.S. Cl. .......................... 280/216; 280/259; 180/308; 60/468
[58] Field of Search ................................... 280/216, 215, 280/214, 236, 237, 259; 60/468; 180/367, 305, 307, 308

[56] References Cited

U.S. PATENT DOCUMENTS

| | | | |
|---|---|---|---|
| 4,087,105 | 5/1978 | Amarantos | 280/216 |
| 4,194,365 | 3/1980 | Stoufflet et al. | 60/468 |
| 4,249,750 | 2/1981 | Kantner | 280/216 |
| 4,546,990 | 10/1985 | Harriger | 280/216 |
| 4,575,160 | 3/1986 | Leiber et al. | 303/110 |
| 4,688,815 | 8/1987 | Smith | 280/216 |
| 4,694,647 | 9/1987 | Yoshida | 60/442 |
| 4,776,165 | 10/1988 | Iino | 60/431 |
| 4,850,192 | 7/1989 | Mitsumasa et al. | 60/468 |
| 4,887,428 | 12/1989 | Iino | 60/468 |
| 4,962,644 | 10/1990 | Polacek | 60/435 |
| 5,259,256 | 11/1993 | Brackett | 74/49 |
| 5,351,567 | 10/1994 | Brackett | 74/49 |
| 5,387,000 | 2/1995 | Sato | 280/216 |
| 5,417,309 | 5/1995 | Brackett | 184/6.5 |
| 5,423,560 | 6/1995 | Warrick et al. | 280/216 |
| 5,445,039 | 8/1995 | Brackett | 74/49 |
| 5,456,159 | 10/1995 | Brackett | 92/138 |
| B1 5,259,256 | 6/1995 | Brackett | 74/49 |

FOREIGN PATENT DOCUMENTS

| | | | |
|---|---|---|---|
| 850405 | 7/1949 | Germany | 280/216 |

*Primary Examiner*—Kevin Hurley
*Attorney, Agent, or Firm*—Selitto & Associates, P.C.

[57] ABSTRACT

A device for transmitting power between mechanical movements which includes a fluid pump coupled to a first mechanical movement for pumping a fluid, a fluid motor coupled to a second mechanical movement and a manifold connecting the fluid pump and the fluid motor capable of conducting fluid output from the fluid pump to the fluid motor to drive the fluid motor and recirculate the fluid back to said fluid pump. Either the fluid pump and/or the fluid motor incorporates a conjugate drive motion translator. The power transmission is suitable for use on a bicycle replacing the typical gears and chain and preferably includes a shunt to permit the motor to override the pump, an apportionment valve to control the ratio of movement between a first and second mechanical movement, and a brake valve for stopping the second mechanical movement.

27 Claims, 6 Drawing Sheets

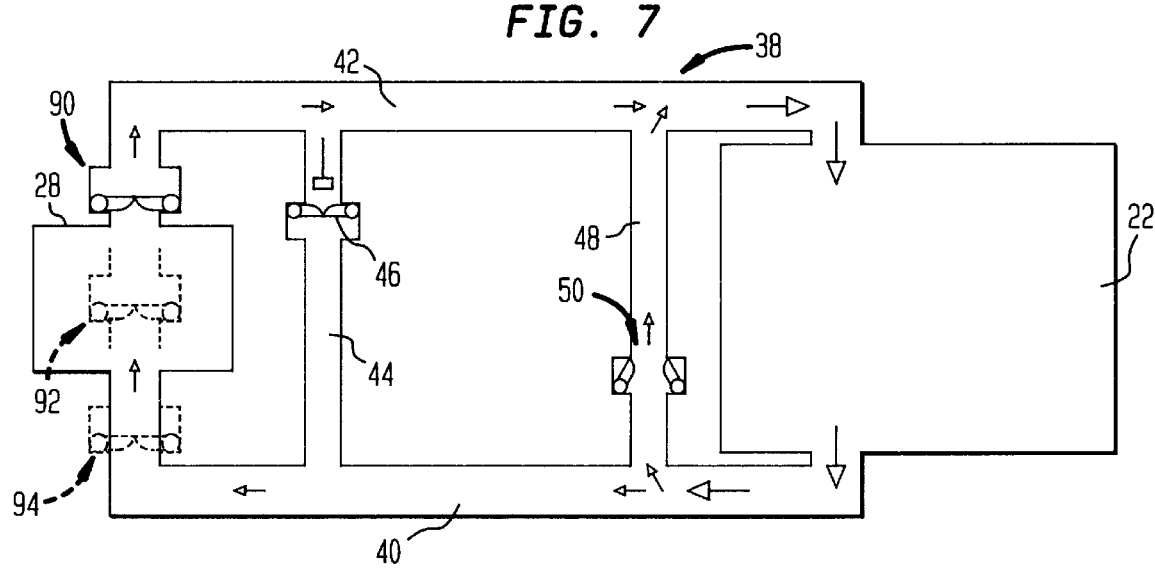

HYDRAULIC BICYCLE WITH CONJUGATE DRIVE MOTORS

FIELD OF THE INVENTION

The present invention relates to power and motion transmission apparatus, and more particularly to a transmission mechanism for transmitting power from the pedals of a bicycle to the rear wheel.

BACKGROUND OF THE INVENTION

Various transmission apparatus have been proposed over the years employing gears, clutches, chain drives, belts and the like. As applied to the problem of bicycle propulsion, the traditional mechanism for transmitting power from the rider to a motive wheel is a chain drive wherein a drive sprocket is attached to the pedals of a bicycle and a driven sprocket is attached to the rear wheel. A chain is engaged in the teeth of the sprockets such that rotation of the pedals in a first direction induces the rear wheel to turn. The driven sprocket is generally coupled to the rear wheel via a ratchet or one-way clutch such that the sprocket acts on the rear wheel in one direction of rotation only, i.e., the forward direction, but spins freely in the other direction. This one-way coupling of the drive sprocket to the motive or driven wheel permits the bicyclist to stop pedaling when coasting or braking. It has also become quite common for bicycles to incorporate gear change apparatus to select from a set of available gear ratios between the driven sprocket and the drive sprocket. This is normally accomplished by providing a nest of progressively larger driven sprockets at the rear wheel and a number of drive sprockets coupled to the pedals. Movable chain guides in conjunction with a chain tensioner allow the bicyclist to select which sprockets are utilized by positioning the drive chain over the correct sprocket pair via levers and cables.

While the traditional bicycle chain drive has served its purposes well over the years, it does have certain limitations of functionality and safety. For example, in order to reduce weight, chain drives are typically exposed, creating a safety risk to the rider in the form of entangling clothing in the chain and sprocket. Selectable ratio bicycle transmissions are prone to shifting to the wrong gear and to positioning the chain in an intermediate position between sprockets, leading to a surprising and dangerous slipping of the chain and the consequent unbalancing of the cyclist. Because the chain and sprocket require lubrication, they become a magnet for dust and dirt which impedes efficient power transmission, wears the chain and sprockets and frequently ruins clothing that contacts it by imparting a dirty, greasy stain.

It is therefore an object of the present invention to provide a transmission that reliably and efficiently transmits power from a first mechanical movement to a second. It is a further an object to provide a transmission which can be applied to a bicycle that is cleaner, safer and easier to use than a chain drive.

SUMMARY OF THE INVENTION

The problems and disadvantages associated with the conventional techniques and devices utilized to transmit power between mechanical movements are overcome by the present invention which includes a fluid pump coupled to a first mechanical movement for pumping a fluid, a fluid motor coupled to a second mechanical movement and a manifold connecting the fluid pump and the fluid motor. The manifold is capable of conducting fluid output from the fluid pump to the fluid motor to drive the fluid motor. Fluid is recirculated back to the fluid pump. Either the fluid pump and/or the fluid motor incorporates a conjugate drive motion translator.

BRIEF DESCRIPTION OF THE FIGURES

For a better understanding of the present invention, reference is made to the following detailed description of an exemplary embodiment considered in conjunction with the accompanying drawings, in which:

FIG. 7 is a schematic view of the present invention as shown in FIG. 6C and further schematically depicting a brake.

DETAILED DESCRIPTION OF THE FIGURES

Figure 1:
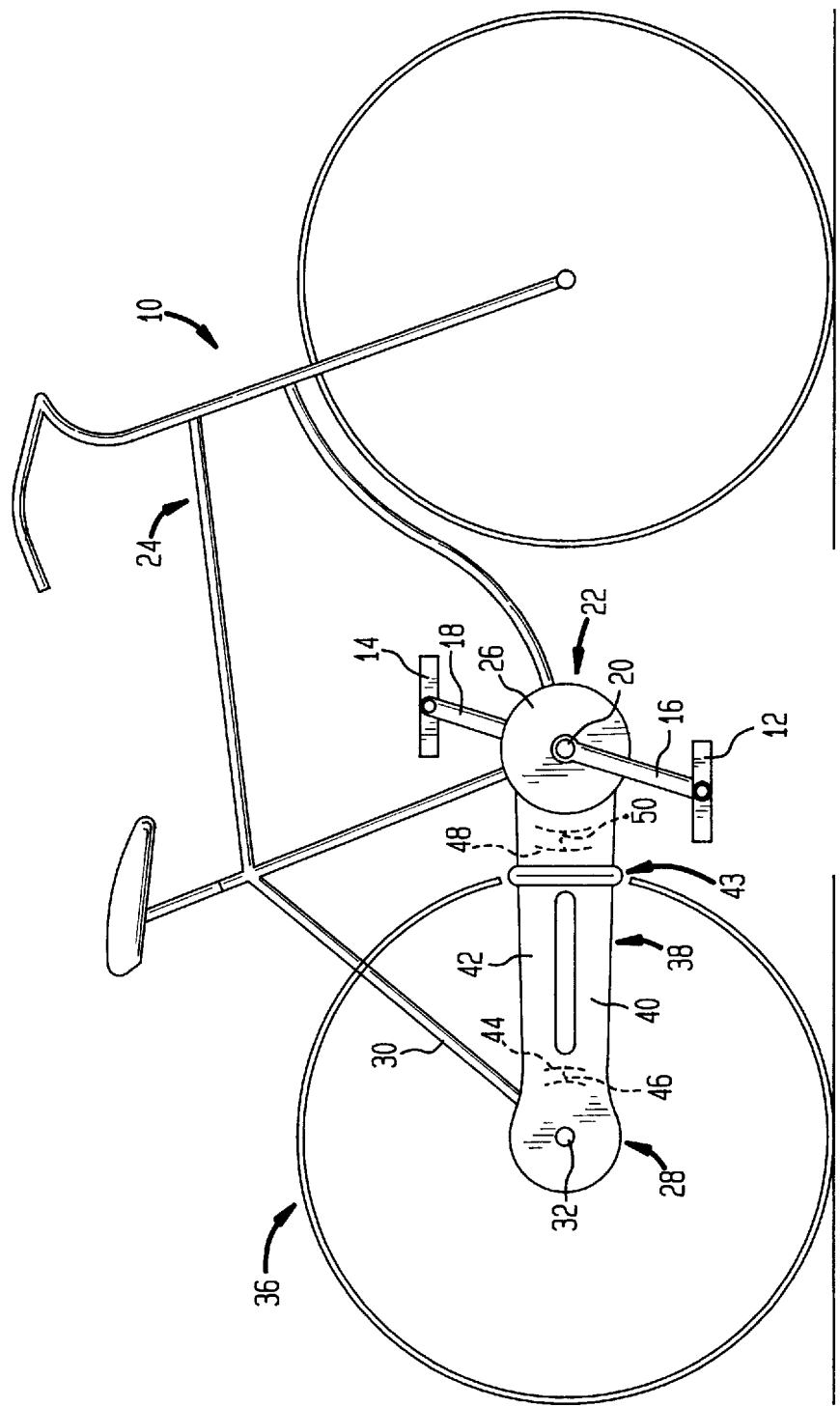
FIG. 1 is an elevational view of a bicycle in accordance with an exemplary embodiment of the present invention.

FIG. 1 shows a bicycle 10 having a pair of pedals 12, 14 for receiving the feet of a rider. The pedals 12, 14 are rotatably mounted on a pair of pedal cranks 16, 18, respectively, in a conventional manner. Unlike a traditional bicycle where the cranks 16, 18 would be mounted to a drive sprocket shaft, in the present invention, the cranks 16, 18 are mounted to the shaft 20 of a pedal engine 22. The pedal engine 22 is a positive displacement pump for pumping fluids such as hydraulic fluid, oils and gases that is mounted to the bicycle frame 24 with the engine block 26 stationary and the shaft 20 free to rotate as controlled by the rotation of the pedals 12, 14 by the rider. The method of mounting the engine 22 is conventional and in the manner of that by which internal combustion engines are mounted to the frames of mopeds and motorcycles. A wheel motor 28 of essentially the same general design as the pedal engine 22, viz., that of a positive displacement pump, is mounted to the rear forks 30 of the bicycle frame 24. The shaft 32 of the wheel motor 28 is stationary relative to the bicycle frame 24 and may be threaded on either end to approximate the configuration of a traditional rear sprocket shaft which is held onto the rear fork 30 by nuts which compress the forks inward against a land on the shaft 32. The wheel motor block 34 (see FIG. 2) is rotatable about the wheel motor shaft 32 in conjunction with the rear wheel 36. The exterior of the wheel motor block 34 may be configured in the form of a spindle having a pair of spaced, drilled flanges with a plurality of holes for receiving the spokes of the rear wheel 36 or may be held fast to an independent wheel spindle or a solid wheel disk web by bolts or the like.

A manifold 38 is provided to carry the fluid pumped out of the pedal engine 22 to the rear wheel motor 28 to establish a hydraulic connection for transmitting power from the pedals 12, 14 to the rear wheel 36. As stated previously and as will be appreciated from FIGS. 3, 4 and 5, the pedal engine 22 and the wheel motor 28 are both positive displacement pumps, such that the rotation of the pedals 12, 14 a selected number of degrees will correspond to a predetermined output volume of working fluid transmitted to the wheel motor 28 via a first conduit, viz., the feeder conduit 40. In similar fashion, the reception of a given volume of fluid under pressure at the wheel motor 28 will generate a corresponding predetermined number of degrees of rotation of the motor block 34 and the rear wheel 36 to which it is coupled. Given that the hydraulic connection between the pedal engine 22 and the wheel motor 28 is to be maintained without interruption by contaminants in the working fluid, such as a fluid of different density, e.g., air in a system using hydraulic fluid, the wheel motor 28, the manifold 38 and pedal engine 22 have all swept volumes thereof filled with fluid at all times. As a consequence, when the wheel motor 28 is rotated by the fluid output of the pedal engine 22, a fluid output from the wheel motor 28 is induced which is redirected back to the input of the pedal engine 22 through a second conduit in the manifold, viz., return conduit 42. Thus, the manifold 38 redirects fluid back from the wheel motor 28 to the pedal engine 22 in circuitous fashion such that the same working fluid is constantly recycled. Since the entire system is filled with fluid, Pascal's dictates that the fluid pressure will be equal on all surfaces within a closed volume. Accordingly, the work force will be divided between the pressure and suction side of the wheel motor.

Preferably, the interior contours and volumetric capacity of the manifold 38 are optimized using known hydraulic principles and methods to maximize flow therethrough and to prevent unnecessary fluid turbulence, friction and back pressure. The capacity of the manifold 38 is selected to accommodate the flow volume without appreciable back pressure. The manifold 38 may be cast of any light material such as plastic or aluminum, or may be formed from mandrel bent tubing of suitable volumetric capacity. The manifold 38 is connected to the inlet and outlet ports of the pedal engine 22 and wheel motor 28 in accordance with methods known to those in the art of hydraulic connections and fluid pumps. For example, the pedal engine 22 may be provided with inlet and outlet ports having a suitable surrounding surface for seating a compression gasket interposed between the manifold 38 and the engine 22. Similarly O-ring seals and/or threaded fittings may be employed.

Alternatively, the manifold may be formed as a continuous casting or molding in continuity with the pedal engine 22 and/or wheel motor 28. To facilitate changing the rear wheel, the manifold 38 may be provided with a flexible link 43 made of an elastomeric material that allows the manifold 38 to be bent such that the manifold 38 and/or wheel motor 28 swings clear of the frame 30 and/or rear wheel 36.

As is known from traditional bicycle designs, it is highly desirable to have a mode of operation wherein the drive wheel can freewheel when overtaking the pedalling action of the rider, such as when the rider rests or coasts. This function may be performed by the present invention by including a first shunt manifold passage or coast shunt passage 44 (phantom view) that permits fluid recirculation into and out of the wheel motor 28 without fluid coupling to the pedal engine 22. A one-way shunt valve 46 (phantom view) must be provided to control the passage of fluid through the coast shunt passage 44. The flow direction that is enabled through the shunt valve 46 is from the return conduit 42 to the feeder conduit 40. The shunt valve 46 may be any spring loaded or pressure activated valve, such as a spring loaded or pressure activated poppet valve, a reed valve or the like. In operation, when pedalling is stopped and the cycle continues to coast, the rotating wheel 36 causes the wheel motor 28 to pump fluid. Because the fluid output of the wheel motor 28 is not received by the pedal engine 22, which is stationary, and because there is no new fluid supplied to the input side of the wheel motor 28, pressure builds in the coast shunt passage 44 overcoming the closure pressure of the shunt valve 46 allowing fluid to pass through the coast shunt passage 44 and the local portion of the feeder conduit 40 leading to the inlet side of the wheel motor 28.

The present invention also accommodates the desire to change drive ratios by providing a power shunt passage 48 (phantom view) connecting the feeder conduit 40 to the return conduit 42 and controlled by a power shunt valve 50. The power shunt valve 50 controls the amount of fluid output from the pedal engine 22 that is shunted or recirculated back to the pedal engine 22 input rather than being directed to the input of the wheel motor 28. By controlling the volume of fluid reaching the wheel motor 28 for a given number of degrees of pedal rotation, the ratio of degrees of pedal rotation to degrees of drive wheel rotation can be controlled. The power shunt passage 48 and power shunt valve 50 give the present invention the characteristics of an infinitely variable speed transmission. With the power shunt valve 50 closed, all of the fluid pumped out of the pedal engine 22 is directed by the feeder conduit 40 to the wheel motor 28 producing the highest number of revolutions per minute for the drive wheel 36. As the shunt valve 50 is opened, a portion of the fluid output of the pedal motor 22 bleeds back through the power shunt passage 48 to the return conduit 42 on the intake side of the pedal engine 22. Since a portion of the fluid output of the pedal engine 22 is recirculated without passing through the wheel motor 28, the wheel motor 28 rotates at a lower rpm. For example, if the pedal engine 22 and the wheel motor 28 each displace one hundred cubic centimeters of fluid volume in one revolution and the power shunt valve 50 is closed, then one revolution of the pedal engine 22 would produce one revolution of the wheel motor 28. For this same set of conditions, if the power shunt valve 50 is opened to allow one-quarter of the pedal engine 22 pump output to be recirculated back to its inlet side, then the wheel motor 28 will rotate only three quarters of a revolution.

As a second example, if the pedal engine 22 displaces one hundred cubic centimeters of fluid in one revolution and the wheel motor 28 displaces twenty-five cubic centimeters of fluid in one revolution with the power shunt valve 50 closed, then one revolution of the pedal engine 22 will result in four revolutions of the wheel motor 28. Under the same conditions, if the power shunt valve 50 were opened to permit three quarters of the pedal engine 22 output to be recirculated to its input side, then one revolution of the pedal engine 22 will generate one revolution of the wheel motor 28.

Both the coast shunt valve 46 and the power shunt valve 50 may be manually controllable, semi-automatic or fully automatic. For example, the coast shunt valve 46 could be actuated by a hand lever, be enabled by manual control, or automatically respond to pressure differentials by virtue of a spring's compressibility characteristics under a given pressure. Similarly, actuation of the power shunt valve 50 may be manual, enabled to occur (semiautomatic) or automatic under the control of a centrifugal governor or electronic control.

Figure 2:
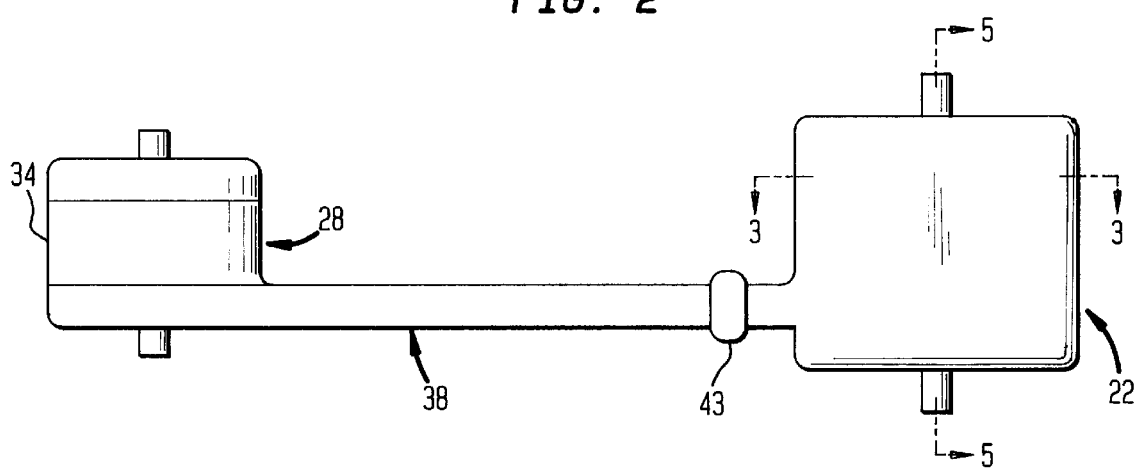
FIG. 2 is a plan view of the pedal engine/wheel motor with connecting manifold of the bicycle of FIG. 1.

FIG. 2 shows a top view of pedal engine 22, wheel motor 28 and manifold 38.

Figure 3:
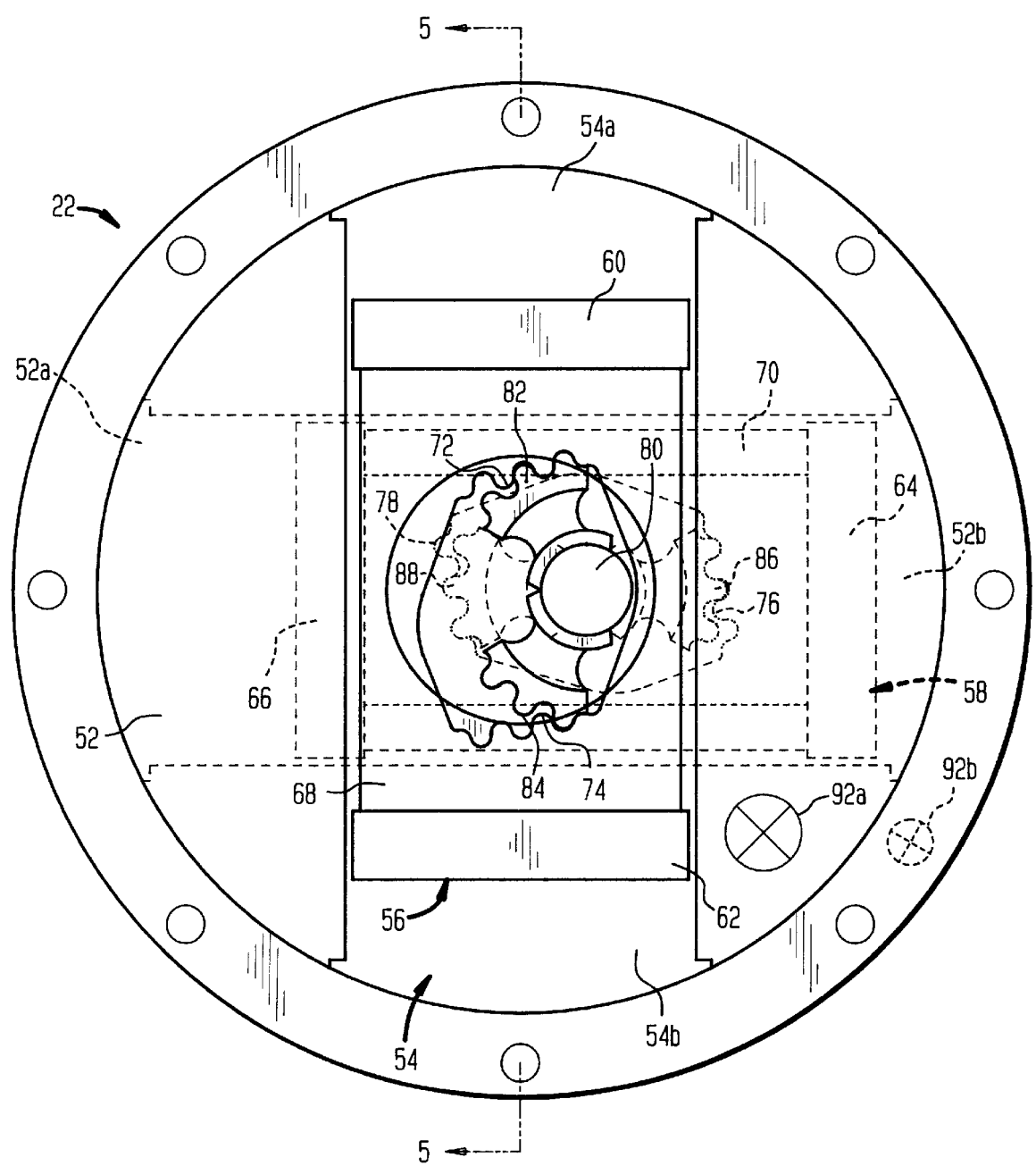
FIG. 3 is a cross-sectional view of the pedal engine/wheel motor of the bicycle of FIGS. 1 and 2, taken along section line III-III and looking in the direction of the arrows.
Figure 4:
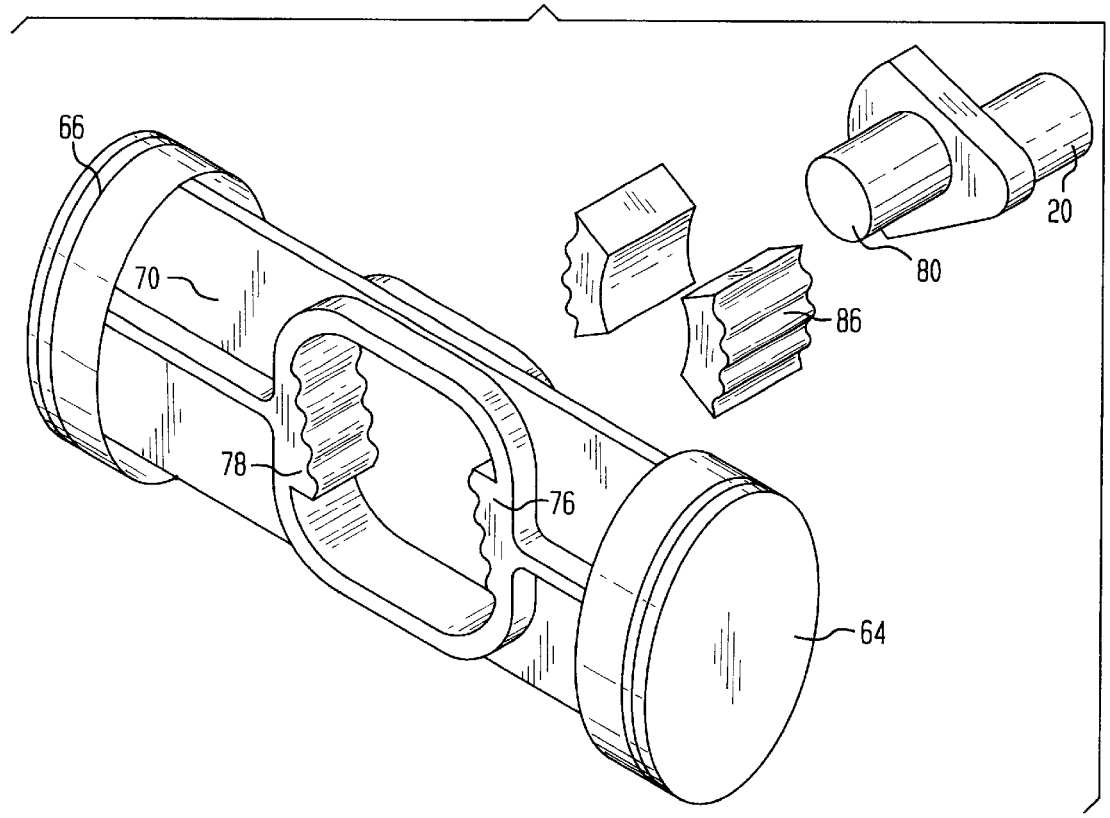
FIG. 4 is an exploded view of the piston set, mating conjugate driver and crankpin of the pedal engine/wheel motor shown in FIG. 3.
Figure 5:
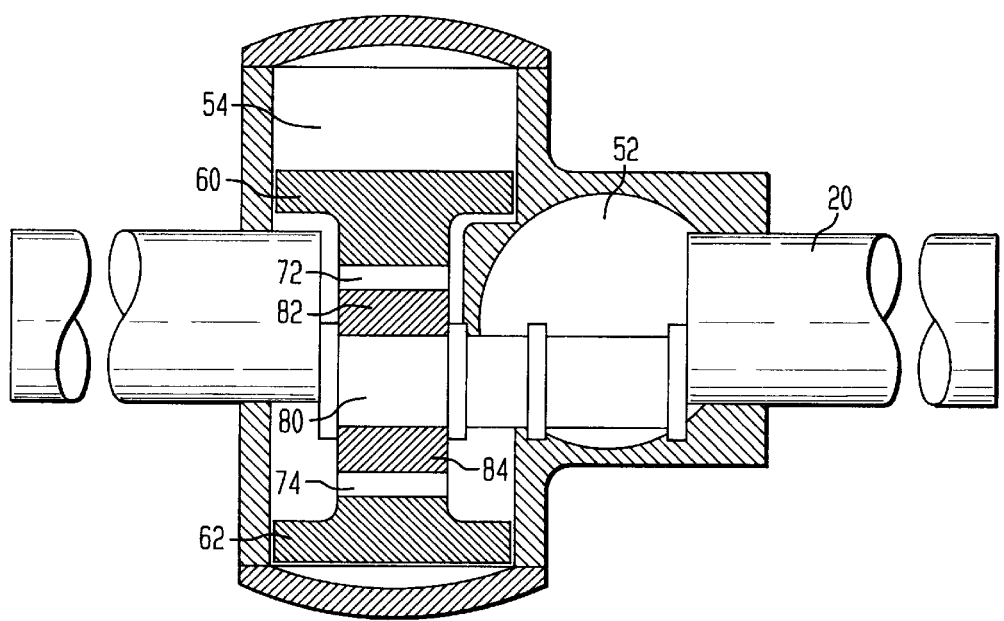
FIG. 5 is a cross-sectional view of the pedal engine/wheel motor of FIG. 2 taken along section line V—V and looking in the direction of the arrows.

FIGS. 3, 4 and 5 show the internal components of a pedal engine 22 in accordance with the present invention. The wheel motor 28 may have the exact same configuration and for the purposes of the following description is assumed to be the same as the pedal engine 22. Whereas many different types of positive displacement pumps can be employed as the pedal engine 22 and/or the wheel motor 28, the embodiment of the present invention depicted in FIGS. 3, 4 and 5 is that of a pump using a unique motion translator invented by the present inventor herein and entitled a "conjugate drive" type motion translator. A complete description of conjugate drive motion translators is provided in U.S. Pat. Nos. B1 5,259,256, 5,259,256, 5,351,567, 5,417,309, 5,445,039 and 5,456,159, such patents being incorporated herein by reference for their teachings regarding conjugate drives. Both the pedal engine 22 and the wheel motor 28 employ conjugate drive positive displacement pumps in the embodiment of the present invention depicted in FIGS. 3, 4 and 5.

The conjugate drive is a new mechanical linear-to-rotary or rotary-to-linear motion conversion device with considerable advantages over conventional connecting rod, scotch yoke, and other standard mechanisms. The conjugate drive is a compact design which has less inertia, bearing loads, and structural weight than standard mechanisms and uses a rigid structure to transfer forces through wave-shaped interface surfaces allowing for a pure rolling motion with continuous contact. The waved-shaped interface surfaces provide for a wide range of unique, highly flexible, dynamic piston motion controls. These motions allow the conjugate drive to optimize the input force and increase mechanical efficiencies. As a fluid pump, the conjugate drive can be effectively used as an alternative transmission for a typical bicycle. The conjugate drive bicycle transmission is, at minimum, comparable to the typical chain-drive bicycle transmission, and in most respects, is significantly better than the standard chain-drive. Those areas include: (1) equal or lighter weight; (2) equivalent cost; (3) decreased operational noise; (4) easier maintenance; (5) greater reliability; (6) greater mechanical efficiency in the real user environment; (7) exhibits improved biomechanical efficiency to optimize leg muscle power profile in training; (8) eliminates chain backlash and (9) provides a smooth, infinitely variable speed control shift for speed control.

As noted above, the relative volumetric capacity of the pedal engine 22 and wheel motor 28 will determine the ratios available for driving the bicycle. One can note that the pedal engine 22/wheel motor 28 depicted in FIGS. 3 and 5 has four cylinders 52a, 52b, 54a, 54b with a block having a pair of skewed, perpendicularly oriented cylinder bores 52, 54. The cylinder bores 52, 54 slideably receive a pair of mating double-ended piston assemblies 56, 58 (shown in phantom) therein. The double ended piston assemblies 56, 58 are composed of a pair of pistons 60, 62 and 64, 66 joined by a connective open web 68, 70, respectively. While the piston assemblies are described as being composed of multiple parts for the purposes of explaining the invention, they may be formed as a single forging or casting, if desired. The webs 68, 70 each receive a corresponding pair of conjugate bearings 72, 74 and 76, 78, respectively, affixed thereto. A crankpin 80 rotates with the shaft 20 at a fixed offset or throw. In the wheel motor 28, the motor block 34 rotates about the crankshaft 32, which is fixed. A pair of conjugate drivers 82, 84 and 86, 88 are disposed between the crankpin 80 and the conjugate bearings 72, 74 and 76, 78, respectively.

FIG. 4 illustrates an embodiment of the present invention wherein the conjugate bearings 76 and 78 are formed monolithically in the web 70. Pistons 64 and 66 may also be integrally formed with the web 70.

As the crankpin is turned through each 360 degree rotation, the conjugate drivers 82, 84 and 86, 88 engage the conjugate bearings 72, 74 and 76, 78 transferring crankpin motion to the double-ended piston assemblies 56, 58. For the purpose of explaining the present invention, however, it can be noted that the conjugate drive provides an efficient and durable rotary-to-linear motion interconverter that augments the pumping action of both the pedal engine 22 and the wheel motor 28.

Given the cylinder configuration illustrated in FIGS. 3, 4 and 5, it can be appreciated that each piston assembly 56, 58 will oscillate between a pair of extreme positions for each rotation of the crankshaft. Since the double ended piston assemblies 56, 58 divide each cylinder bore 52, 54 into a pair of cylinders, viz., 52a, 52b and 54a, 54b, respectively, having opposite directionality, the piston assembly position at the first extreme position corresponds to top piston position for the first cylinder and bottom piston position for the other. Conversely, at the other extreme position, the first cylinder is at bottom piston position and the other is at top piston position. In this sense, the cylinders 52a, 52b, 54a, 54b defined by each piston assembly are complementary, i.e., when one is on the intake stroke, the other is exhausting and vice versa. It is necessary that the output volume of the pedal engine equal the input volume because the system is closed and the volume of fluid output must be accommodated by the input stroke of its complementary cylinder. The same can be said of the wheel motor. While a four cylinder pedal engine is depicted, the number of cylinders can be any multiple of two.

Figure 6A:
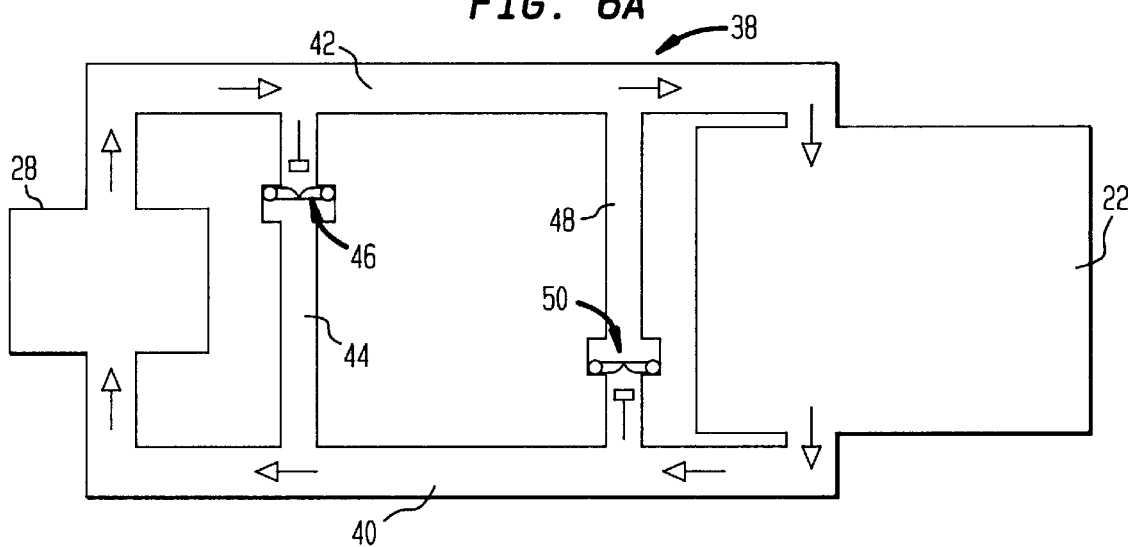
FIGS. 6A–6C are schematic views of the pedal engine/wheel motor and connecting manifold of FIGS. 1–5 in three different modes of operation, viz., minimum pedal engine-to-wheel motor turn ratio (6A), coast mode (6B) and at an intermediate turn ratio (6C)
Figure 6B:
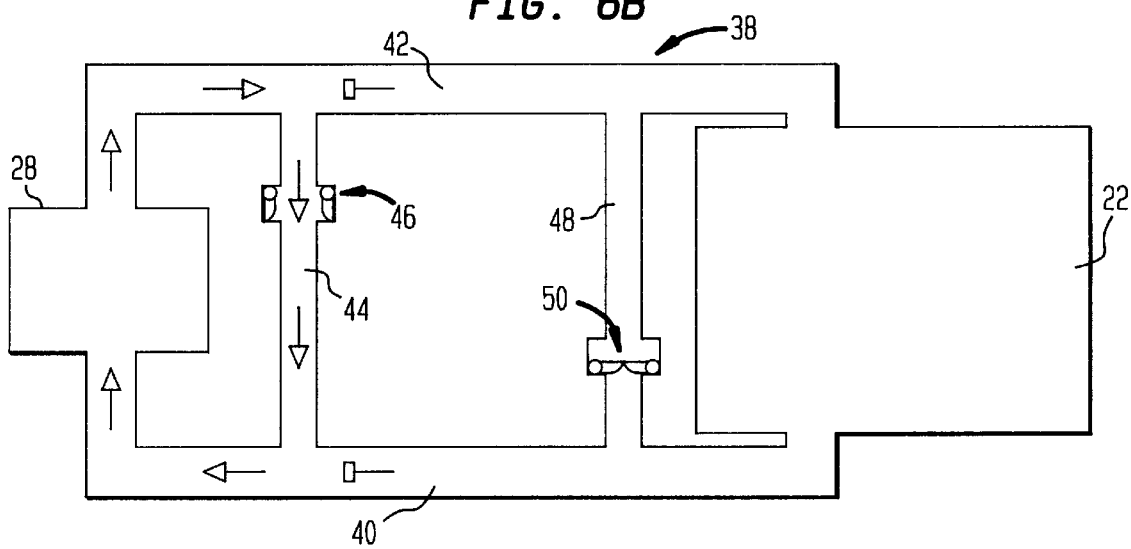
Figure 6C:
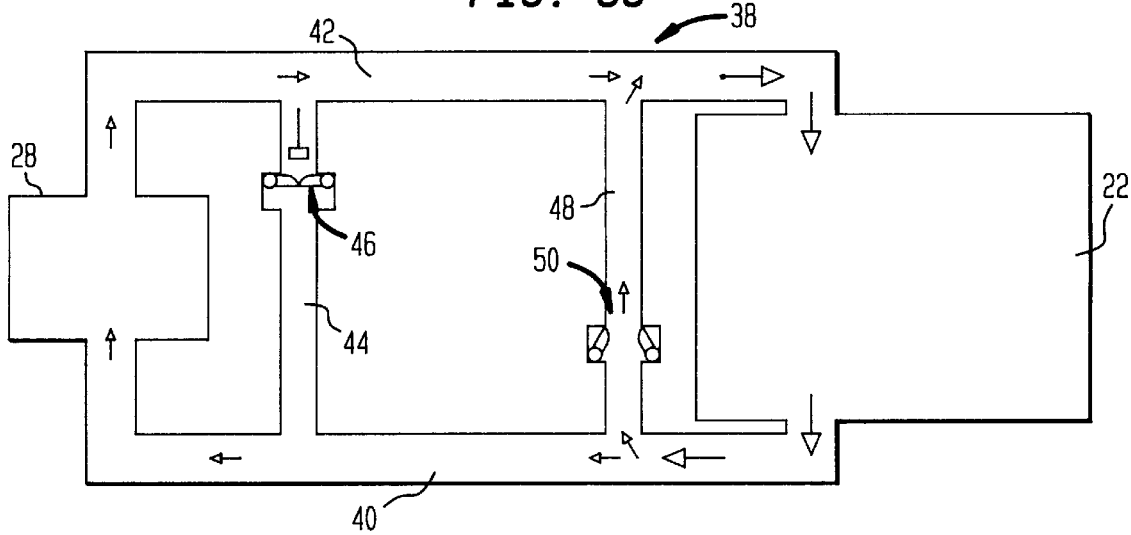

FIGS. 6A–6C show the operation of the present invention diagrammatically. The wheel motor 28 may have the exact same configuration as the pedal engine 22 and, for the purposes of the following description, both may be assumed to be identical.

A source of motive power actuates the engine 22. In the bicycle embodiment shown in FIG. 1, the source of power is the rider acting through the pedals 12, 14 and the pedal arms 16, 18. Of course, it is not required that the power source be a human; an internal combustion, electric or steam engine could be employed. As a further alternative, a supplementary power source such as an electric motor, Stirling engine, compressed air cartridge, etc. coupled to a pump could be employed to assist a human in powering the vehicle. Whereas most conventional sources of power will communicate their power via a rotating output shaft, a reciprocating output, such as a piston drive shaft or a fluid under pressure would also be applicable for coupling the power source to the engine 22. As with the power source, the engine 22 shown in the embodiment of FIG. 1 may have a rotating shaft for converting the rotary motion of the power source into motion of the fluid displacement apparatus constituting the engine 22. It should be noted that the engine 22 has been denominated such due to its relationship to the fluid motor 28 because the engine 22 is the more active element, with the motor 28 responding to the output of the engine.

Given an engine 22 that is suitable for displacing fluid when actuated by a source of motive power P, the first mode of operation as shown in FIG. 6A can be achieved. Namely, when valves 46 and 50 are closed, shunt passages 44 and 48 are blocked. Fluid output from the engine 22 is therefore directed in its entirety by feeder conduit 40 to the fluid motor 28. The fluid passes through the motor 28 inducing a mechanical output which is coupled to an output mechanism, e.g., 36, in the embodiment depicted in FIG. 1, a wheel. While a wheel is depicted as the output mechanism, the present invention could be utilized to turn a shaft leading to a rear wheel differential, a propeller, or any other mechanism.

The relative volumetric capacities of the engine 22 and motor 28 determine the drive ratios available. Upon exiting the fluid motor 28, the fluid is returned via the return conduit 32 to the inlet side of the engine 22 where it is again passed through the engine under the impetus of the power source. In the mode of operation depicted in FIG. 6A, the engine 22 is turning the motor 28 at the lowest possible engine rpm-to-motor rpm ratio.

FIG. 6B shows another mode of operation, wherein the motor 28 is overrunning the engine 22. This can occur if the driven element, due to inertia or some other force, turns the motor 28 at a rate such that the motor fluid output exceeds that produced by the fluid engine 22. As noted above, this condition occurs during operation of a bicycle when the operator stops pedaling and coasts. When motor 28 fluid displacement exceeds that of engine 22, the feeder conduit 40 becomes depressurized and the return conduit 42 is pressurized. This pressure differential can be utilized to control a valve 46 through the shunt passageway 44 such that the fluid excess produced by the motor 28 can be conducted through the passageway 44 back to the feeder conduit 40 and into the motor 28 inlet. Without the shunting depicted in FIG. 6B, the hydraulic linkage between the engine 22 and motor 28 could prevent the motor 28 from being actuated without a corresponding actuation of the engine 22.

FIG. 6C depicts a third mode of operation for the present invention wherein valve 50 controlling shunt passageway 48 is opened, allowing pressurized fluid to pass from the feeder conduit 40 to the depressurized return conduit 42 and into the intake side of the engine 22. Since a portion of the fluid output of the engine 22 is diverted through shunt passageway 48, the volume of fluid reaching the motor 28 is reduced, reducing the corresponding mechanical displacement of driven member 36. In this manner, the ratio of engine 22 rpm-to-motor 28 rpm can be controlled, with the maximum valve 50 opening corresponding to the greatest engine 22 turn-to-motor 28 turn ratio.

In order to function as a pump, the cylinders of the pedal engine 22 and the wheel motor 28 must be valved to the conduits of the manifold 38 such that a uni-directional flow is established, i.e., on the input stroke, the pedal engine cylinders must communicate with the return conduit 42. On the output stroke, the pedal engine cylinders must be in fluid communication with the feeder conduit 40. The wheel motor works the same way but with the manifold correlations reversed. The principles and methods used to provide valving for pumps have been well explored and are within the understanding and working knowledge of the normally skilled artisan in the field of pumps. Accordingly, a specific valving arrangement is not shown, but could include, e.g., cam actuated poppet valves, reed valves, string biased poppet valves, disc valves, etc., all as commonly known in the art.

FIG. 7 shows the same basic apparatus as described above, but in addition, a brake valve 90 has been inserted into the return conduit 42. The brake valve can be implemented using any known valve mechanism, such as poppet valve, gate valve, ball valve or disc valve and restricts the flow from the wheel motor 28 when closed (brake applied).

Closure of the brake valve creates hydraulic backpressure that restricts the wheel motor from displacing fluid. As with the application of brakes generally, it is typically desirable to apply the braking force gradually, the present invention accommodates gradual braking via the gradual closure of the brake valve. Whereas the brake valve 90 is shown in the return conduit in FIG. 7, it could also be placed in the feeder conduit 94 (phantom) or within the fluid transfer passageways of the wheel motor itself 92 (phantom). The phantom views of the brake valve 92, 94 are therefore intended to depict alternate arrangements for the placement of brake valve 90.

Referring back to FIG. 3, a brake valve 92A may be provided in a fluid passageway between the cylinders 52, 54 or in the exterior casting of the wheel motor, as shown by valve 92B (recalling that the wheel motor 28 may be configured like the pedal engine 22 depicted in FIG. 3). It should be appreciated that placement of the brake valve 92A or 92B in the pedal engine 22 would not be efficacious. Further, it is known that brake operation can be controlled by antilock systems (ABS) which may be applied to the brake system of the present invention.

As can be appreciated, the working fluid or power transfer agent has to meet a conflicting set of criteria, viz., it should be selected to provide minimal internal friction while at the same time reducing the friction between moving parts of the apparatus and protecting moving parts from excessive wear. An additional design objective bearing upon the selection of working fluid is the size of the pedal engine 22 and wheel motor 28. In general, it is desirable to select the smallest engine/motor combination that can stand the stresses placed upon it. In this manner, working fluid volume is decreased and energy losses due to moving the working fluid are reduced. The working fluid, however, may present boundaries to miniaturization if the stresses set up in the engine 22 and wheel motor 28 exceed the ability of the working fluid to protect moving parts from unacceptable wear. Given that the power transmitted from the rider to the rear wheel will be less than 2 horsepower, light weight lubricating oils of viscosities from 5 W to 10 W are suitable as the working fluid.

Whereas, the previous examples of working fluid have described a fluid which is liquid at room temperature, the working fluid can be gaseous at room temperature. For example, air, nitrogen, argon or helium can be employed as the working fluid, either in an uncompressed state, i.e., at atmospheric pressure, or compressed at elevated pressures. Gaseous working fluids decrease the fluid viscosity and internal friction of the fluid, as well as substantially reducing its mass and inertia. Unlike liquids, however, gaseous fluids are compressible and do not provide protection against mechanical friction. A double or multiple fluid combination can be employed as the working fluid, each fluid having its own unique function. For example, a liquid lubricant can be added to gaseous fluids to prevent friction. The transfer agent or working fluid may be under the influence of pressure or vacuum or both. A partially uncompressed gaseous fluid transfer medium permits the wheel motor to be used as a heat engine if desired. For example, a source of heat could be applied to fluid within the wheel motor to assist in the filling (in this instance by expansion) of the wheel motor fluid displacement volume, e.g., cylinder in a piston/cylinder pump. A heat sink, e.g., a radiator could be included in the return conduit 42 to assist the heat engine operation.

Whereas a conjugate drive type pump has been described above for both the pedal engine 22 and the wheel motor 28, it is not absolutely required that both of these components be conjugate drive-type mechanisms. That is, other types of known liquid and gas pumps, for example, connecting rod type piston pumps, Wankel rotary pumps, moving vane pumps, wobble plate pumps, gearrotor and gear pumps may be employed as either the pedal engine or the wheel motor in conjunction with a conjugate drive pump.

The bicycle transmission of the present invention is a completely closed loop system which is essentially maintenance free. All critical components are enclosed in housings which protect them from external contamination. While the conventional bicycle is one of the most mechanically efficient systems known in the world today, exhibiting an average 4% mechanical efficiency loss, this minimal efficiency loss is only true in a clean, laboratory environment. Actual, realistic efficiencies deteriorate drastically to levels well over 20% in real world application. The bicycle of the present invention provides an average 6% loss in the laboratory and maintains that same efficiency level during actual riding conditions. There are no additional losses from environmental contaminants. As a result, the present invention provides a "real" increase in performance as an alternative transmission for the typical bicycle frame.

It should be understood that the embodiments described herein are merely exemplary and that a person skilled in the art may make many variations and modifications without departing from the spirit and scope of the invention as defined in the appended claims. For example, while, traditional two-wheeled, upright, rider-powered bicycles are depicted herein, it is clear that the present invention could readily be applied to three or four wheeled cycles and cars and to engine driven vehicles wherein an internal combustion engine or heat engine supplies the motive power in place of a human rider. A wheel motor 128 may be provided on the front wheel of the bicycle. In similar fashion, the present invention may be utilized to transmit power to the tread of a snowmobile or tank, the propeller of a boat or any other interface element for moving a vehicle. In addition to the task of transmitting power for vehicles, the transmitting apparatus disclosed herein can be utilized for any power transmission task, such as in power generation or machine tool operation. All such modifications and variations are intended to be included within the scope of the invention as defined in the appended claims.

I claim:

1. A transmission for transmitting power between a first mechanical movement and a second mechanical movement, comprising:
    (a) a fluid pump coupled to said first mechanical movement for pumping a fluid;
    (b) a fluid motor coupled to said second mechanical movement; and
    (c) a manifold connecting said fluid pump and said fluid motor, said manifold capable of conducting fluid output from said fluid pump to said fluid motor to drive said fluid motor and recirculating said fluid back to said fluid pump, at least one of said fluid pump and said fluid motor incorporating a conjugate drive motion translator.

2. The transmission of claim 1, wherein said transmission is mounted on a wheeled vehicle having an on-board motive power source as said first mechanical movement, said second mechanical movement being coupled to at least one wheel of said vehicle to enable said vehicle to be moved by said power source.

3. The transmission of claim 2, wherein said fluid pump and said fluid motor are positive displacement devices.

4. The transmission of claim 3, wherein said vehicle is a bicycle and said power source is manual and further comprising pedals attached to said fluid pump which may be pushed manually to activate said pump.

5. The transmission of claim 4, wherein said manifold includes an override shunt passage for circulating fluid through said fluid motor independently of said fluid pump and a first shunt valve for controlling fluid flow through said override shunt passage, said override shunt passage and said first shunt valve permitting said fluid motor to override said fluid pump.

6. The transmission of claim 5, wherein said manifold includes a pressure shunt passage and a second shunt valve for controlling fluid flow through said pressure shunt passage for selectively diverting fluid output of said fluid pump from said fluid motor back to said fluid pump thereby altering the volume of fluid transmitted by said fluid pump to said fluid motor and permitting the ratio movement between said first mechanical movement and said second mechanical movement to be changed.

7. The transmission of claim 6, wherein said fluid is a liquid at room temperature and atmospheric pressure.

8. The transmission of claim 7, wherein said fluid pump has an input volume that varies inversely with an output volume thereof.

9. The transmission of claim 8, wherein said fluid pump is a reciprocating piston pump utilizing a conjugate drive to translate rotary motion of a power input shaft to reciprocation of a piston of said pump.

10. The transmission of claim 9, wherein said fluid motor is a reciprocating piston pump utilizing a conjugate drive to translate reciprocation of a piston of said pump into rotary motion of a power output shaft.

11. The transmission of claim 10, wherein said fluid pump and said fluid motor are the same type of pump.

12. The transmission of claim 6, wherein said second shunt valve is manually controllable.

13. The transmission of claim 6, wherein said second shunt valve is semiautomatic.

14. The transmission of claim 6, wherein said second shunt valve is automatically controlled.

15. The transmission of claim 6, wherein said fluid is in the gaseous state at room temperature and atmospheric pressure.

16. The transmission of claim 5, wherein said first shunt valve is manually controllable.

17. The transmission of claim 5, wherein said first shunt valve is semi-automatic.

18. The transmission of claim 5, wherein said first shunt valve is automatically controlled.

19. The transmission of claim 1, wherein said manifold further includes an override shunt passage for circulating fluid through said fluid motor independently of said fluid pump and a first shunt valve for controlling fluid flow through said override shunt passage, said override shunt passage and said first shunt valve permitting said fluid motor to override said fluid pump.

20. The transmission of claim 1, wherein said manifold further includes a pressure shunt passage and a second shunt valve for controlling fluid flow through said pressure shunt passage for selectively diverting fluid output of said fluid pump from said fluid motor back to said fluid pump thereby altering the volume of fluid transmitted by said fluid pump to said fluid motor and permitting the ratio of movement between said first mechanical movement and said second mechanical movement to be changed.

21. The transmission of claim 1, further including a brake valve for regulating the flow of fluid through said fluid motor for selectively performing a braking function.

22. The transmission of claim 1, wherein said manifold is flexible to permit said fluid motor to be repositioned relative said fluid pump while said fluid pump and said fluid motor are connected to said manifold.

23. The transmission of claim 22, wherein said manifold includes a flexible link.

24. The transmission of claim 1, wherein said fluid pump is a first reciprocating piston pump with at least one pair of opposed pistons, said pump utilizing at least one conjugate drive to translate rotary motion of a power input shaft to reciprocation of said pistons.

25. The transmission of claim 24, wherein said fluid motor is a second reciprocating piston pump with a rotatable housing and at least one pair of opposed pistons affixed to a common shuttle, said fluid motor utilizing at least one conjugate drive to translate reciprocation of said fluid motor pistons to rotary motion of said housing.

26. The transmission of claim 25, wherein said fluid pump includes at least two pairs of said opposed pistons.

27. The transmission of claim 1, wherein said conjugate drive motion translator includes a shuttle having an aperture therein, at least a portion of a peripheral boundary defining said aperture having a trackable profile, said shuttle being moveable along a linear path; a rotatable crankshaft having a crankpin, said crankpin positioned within said aperture with the axis of rotation of said crankshaft substantially perpendicular to said linear path; and a pair of tracking sectors positioned between said crankpin and said trackable profile, said sectors rotatable about said crankpin and independently articulatable through a selected range of degrees, said sectors engaging said trackable profile such that motion is transferable between said crankpin and said shuttle through said sectors.

* * * * *